US012617547B2

(12) United States Patent

Suarez

(10) Patent No.: US 12,617,547 B2

(45) Date of Patent: May 5, 2026

(54) OFFBOARD GRAPHICS RENDERING GATEWAY VIA AVIONICS FULL DUPLEX ETHERNET FOR A COCKPIT DISPLAY SYSTEM

(71) Applicant: NORTHROP GRUMMAN SYSTEMS CORPORATION, Falls Church, VA (US)

(72) Inventor: Manuel E. Suarez, Palm Bay, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 107 days.

(21) Appl. No.: 18/414,788

(22) Filed: Jan. 17, 2024

(65) Prior Publication Data

US 2025/0229911 A1 Jul. 17, 2025

(51) Int. Cl.
| | |
|---|---|
| *B64D 43/00* | (2006.01) |
| *G06F 3/14* | (2006.01) |
| *G06T 1/20* | (2006.01) |

(52) U.S. Cl.
CPC .............. *B64D 43/00* (2013.01); *G06F 3/14* (2013.01); *G06T 1/20* (2013.01)

(58) Field of Classification Search
CPC .............. B64D 43/00; G06F 3/14; G06T 1/20
See application file for complete search history.

(56) References Cited

U.S. PATENT DOCUMENTS

| | | | | |
|---|---|---|---|---|
| 2008/0215192 A1* | 9/2008 | Hardman | ............... | G01C 23/00 |
| | | | | 701/3 |
| 2010/0289671 A1* | 11/2010 | Hauty | ...................... | G01D 7/00 |
| | | | | 340/945 |
| 2018/0373404 A1* | 12/2018 | Sivaratri | ................ | G01C 23/00 |
| 2019/0180530 A1* | 6/2019 | True | ......................... | G06T 7/001 |
| 2019/0327307 A1* | 10/2019 | Watson | .............. | H04L 63/1425 |
| 2021/0328935 A1* | 10/2021 | Nelson | .................... | H04L 41/40 |
| 2024/0194089 A1* | 6/2024 | J | ............................... | G08G 5/21 |

* cited by examiner

*Primary Examiner* — Kee M Tung
*Assistant Examiner* — Khoa Vu
(74) *Attorney, Agent, or Firm* — Shumaker, Loop & Kendrick LLP; John A. Miller

(57) ABSTRACT

A cockpit display system for an aircraft including an off-board graphics rendering gateway system providing additional cockpit display and other functionality. The cockpit display system includes a cockpit display subsystem having a display, a subsystem processor and integrated modular avionics (IMA) with user applications and cockpit display software. The cockpit display system also includes an off-board processor for processing aircraft functionality applications that are not available on the cockpit display subsystem, where the off-board processor provides graphical data over fiber optics to the cockpit display subsystem to be displayed by the cockpit display subsystem. The off-board processor includes a graphics gateway sub-processor that is in communication with the cockpit display subsystem, where the graphics gateway sub-processor exchanges data and information with the cockpit display subsystem over Ethernet cables to provide synchronization with the graphical data provided by the off-board processor to the cockpit display subsystem.

15 Claims, 2 Drawing Sheets

OFFBOARD GRAPHICS RENDERING GATEWAY VIA AVIONICS FULL DUPLEX ETHERNET FOR A COCKPIT DISPLAY SYSTEM

BACKGROUND

Field

This disclosure relates generally to an aircraft cockpit display system and, more particularly, to an aircraft cockpit display system including an off-board graphics rendering gateway system providing additional cockpit display and other functionality.

Discussion of the Related Art

Aircraft manufacturers typically use commercial off the shelf (COTS) aircraft cockpit display systems (CDS) when building an aircraft, including commercial and military aircraft, to provide reduced cost, modularity, flexibility and reliability. A typical COTS CDS may not be specifically designed for military aircraft, but such CDSs can be used for such aircraft. A CDS provides a visible and audible portion of a human machine interface (HMI) that allows aircraft personnel and pilots to manage a modern glass cockpit, and thus interface with the aircraft avionics. CDSs typically include high-resolution multi-color displays, such as liquid crystal displays (LCDs), that present information relating to the various aircraft systems, such as flight management, in an integrated manner. The CDS includes integrated modular avionics (IMA) that allow for the integration of cockpit instruments and displays at the hardware and software level to be maximized. CDS software typically uses API code, such as OpenGL, to integrate the CDS with aircraft systems to access graphics drivers. This software may be written manually or with the help of COTS tools, such as GL Studio, VAPS XT, SCADE Display, etc.

Various standards and protocols provide the integration of the CDS at the software level with aircraft system applications, or user applications (UA). Aeronautical Radio, Incorporated (ARINC) 661 is one of these standards that attempts to normalize the operation of the CDS, and the communications between the CDS and the UAs, which manage aircraft avionics functions. CDS software employs a kernel that is able to create a graphical user interface (GUI) hierarchy specified in the data frame (DF) during initialization, thus eliminating the need to be recompiled if the GUI definition changes. The ARINC 661 protocol does not suggest the use of a particular data bus structure to perform low-level communications between the CDS and UAs. For example, an ARINC 429 or Ethernet protocol, such as avionics full-duplex switched Ethernet (AFDX), also known as ARINC 664, can be used.

The ARINC 664 protocol is a data network used for safety-critical applications that utilizes dedicated bandwidth while providing deterministic quality of service (QoS). The AFDX data network is based on Ethernet technology using COTS components. The AFDX data network is a specific implementation of ARINC 664 Part 7, which is a profiled version of an IEEE 802.3 network per parts 1 & 2, and which defines how COTS networking components will be used for future generation aircraft data networks (ADN). The six primary aspects of an AFDX data network include full duplex, redundancy, determinism, high-speed performance, switched network and profiled network.

COTS CDSs are designed to perform very specific and basic tasks revolving around a pilot's workload and situational awareness and are not meant to be upgraded with any regularity in comparison to how quickly computing evolves. Therefore, aircraft that are going to be in service for decades are often limited with the graphics provided by the CDS installed on delivery and have no ability to display custom rendered graphics on the CDS. However, the aircraft manufacturer, or aircraft buyer, may need to add custom user applications and display graphics for a particular mission or aircraft use that are not supported by the COTS CDS when purchased. Further, as mentioned, the COTS CDS comes loaded with a number of UAs each having a particular function. It may be possible to add other UAs that interact with the CDS. However, if the added UAs require custom graphics for the CDS display, those graphics may not be supported by the CDS protocols, and CDS supported graphics would need to be used.

To overcome these problems, the aircraft manufacturer or aircraft user typically add systems and devices to the cockpit that are not part of the COTS CDS when purchased that do perform the desired function. For example, pilots have been known to use tablets, such as an iPad or Samsung Galaxy, for custom applications that go beyond what is provided by the COTS CDS. ForeFlight is an electronic flight bag application built portable electronic device (PED) to assist pilots and corporate flight departments with flight planning. ForeFlight includes information about facilities such as airports, NAVAIDs, and air traffic control facilities. It also aids pilots in tasks including flight planning, weather monitoring and document management, as well as an electronic logbook to help pilots record flight time.

These added systems and devices are inexpensive, used by the pilots during/before a flight, safely stowed when not in use, and upgraded whenever necessary. However, these devices add a level of complexity to the cockpit environment for the pilot and also add weight to the aircraft. Thus, improvements can be made.

SUMMARY

The following discussion discloses and describes a cockpit display system for an aircraft including an off-board graphics rendering gateway system providing additional cockpit display and other functionality. The cockpit display system includes a cockpit display subsystem having a display, a subsystem processor and integrated modular avionics (IMA) with user applications and cockpit display software. The cockpit display system also includes an off-board processor for processing aircraft functionality applications that are not available on the cockpit display subsystem, where the off-board processor provides graphical data over fiber optics to the cockpit display subsystem to be displayed by the cockpit display subsystem. The off-board processor includes a graphics gateway sub-processor that is in communication with the cockpit display subsystem, where the graphics gateway sub-processor exchanges data and information with the cockpit display subsystem over Ethernet cables to provide synchronization with the graphical data provided by the off-board processor to the cockpit display subsystem.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a cockpit display system including an off-board graphics rendering gateway system providing additional cockpit display and other functionality is merely exemplary in nature, and is in no way intended to limit the disclosure or its applications or uses.

Figure 1:
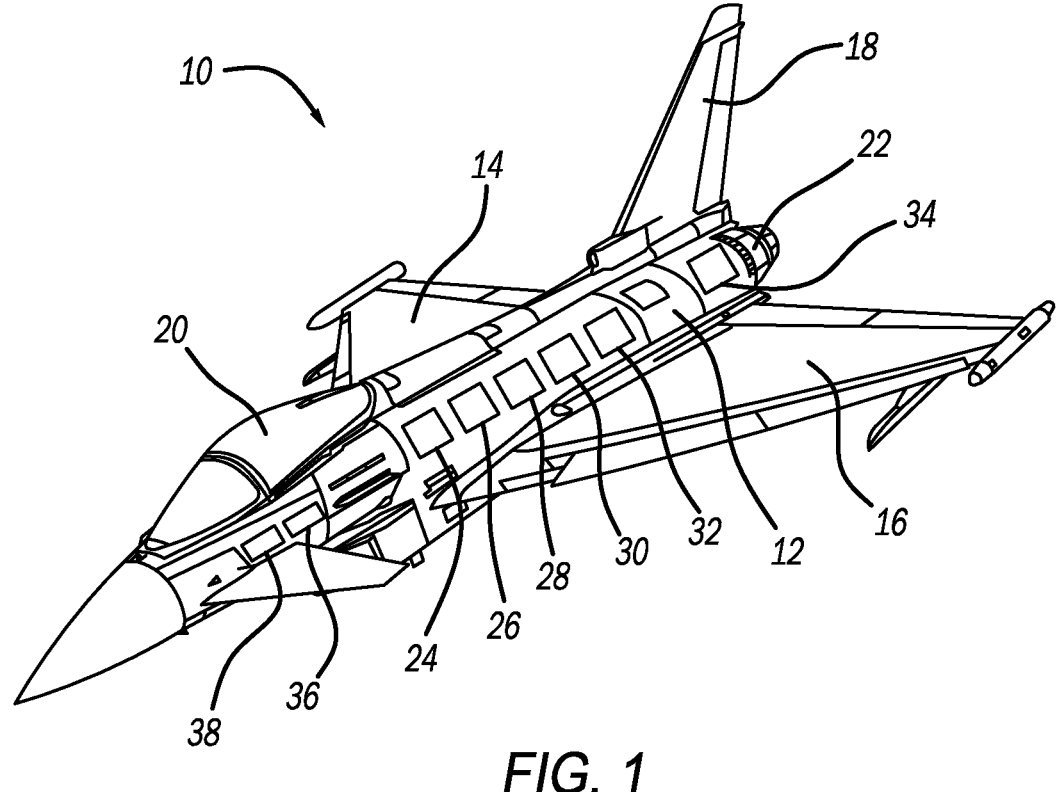
FIG. 1 is an isometric view of an aircraft including a glass cockpit.

FIG. 1 is an isometric view of a military type aircraft 10 that includes a fuselage 12, wings 14 and 16, a tail 18, a cockpit 20 and an engine 22, where the aircraft 10 is intended to represent any aircraft that can benefit from the discussion herein. The aircraft 10 also includes a number of aircraft systems and subsystems that typically fall into three basic categories, namely, systems that provide flight critical functions, mission critical functions and non-essential functions. Those systems and subsystems include, but are not limited to, a fuel system 24, an aerodynamic system 26, a hydraulics system 28, an environmental control system (ECS) 30, a propulsion system 32 and a vehicle management system (VMS) 34. The aircraft 10 also includes non-essential loads 36, such as lighting, that are not required to keep the aircraft 10 flying and a gearbox 38 that reduces or controls the rotational speed of the aircraft engine 22. The operation of these systems and sub-systems and other systems and subsystems on the aircraft 10 is well understood by those skilled in the art.

Figure 2:
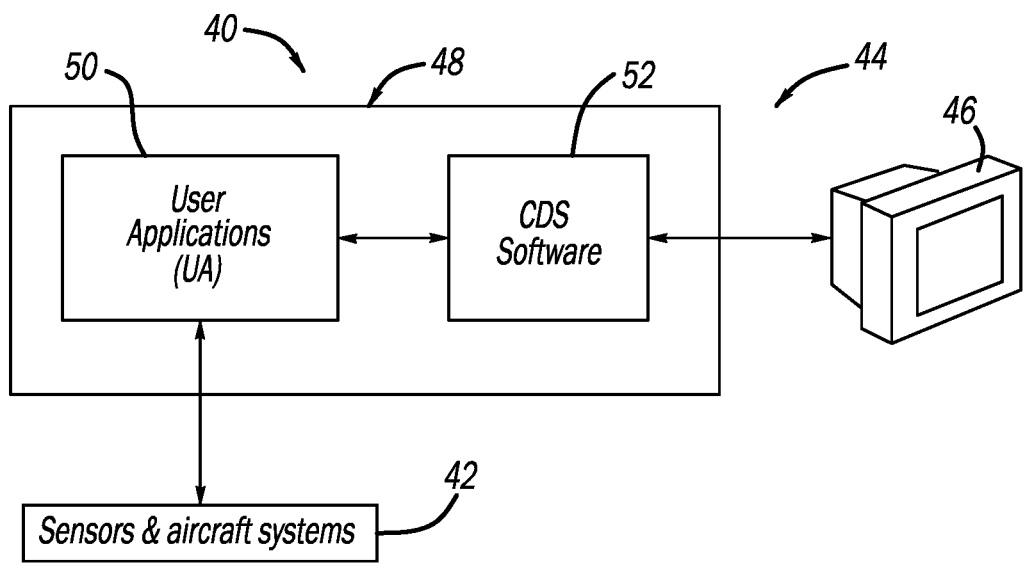
FIG. 2 is a schematic block diagram of an aircraft architecture including a known cockpit display system.

FIG. 2 is a block diagram of a known aircraft architecture 40 including various aircraft sensors and systems, such as those discussed above, represented by box 42. The architecture 40 also includes a COTS cockpit display system (CDS) 44 having a display and control sub-system 46 that allows the pilot to control the aircraft and to display the various aircraft functions. The system 44 also includes integrated modular avionics (IMA) 48 having various user applications 50 that allow the functionality of the various aircraft sensors and systems 42 to be displayed and controlled by the subsystem 46, where applicable, and CDS software 52 that provides an interface between the user applications 50 and the subsystem 46.

The system 44 is representative of a CDS that is provided to the aircraft manufacturer by a supplier, where the various UAs, display graphics and system protocols are loaded onto the CDS 44. As discussed above, if the aircraft manufacturer, or subsequent buyer of the aircraft, wants to add other functionality, displays, UAs, etc. to the cockpit, additional devices and systems may need to be added to the cockpit to provide that functionality, applications, etc.

As will be discussed in detail below, this disclosure proposes an off-board graphics rendering gateway system that allows high intensity computing and rendering to be offloaded to modular/upgradable computing devices. These computing devices are outfitted with specialized software to allow them to communicate over ARINC 664/ARINC 661 protocols. This allows these devices to exist harmoniously within a COTS CDS as a UA, thereby preserving the determinism and reliability of the CDS. Operator controls are streamed to the computing devices via the ARINC 664 protocol so that the operators can seamlessly interact with the rendered graphics. Rendered graphics are streamed to the CDS displays directly through a fiber optics cable over the ARINC 818 standard. Secondary inputs into the CDS can be integrated into the off-board graphics to provide novel displays containing, for example, radar and electro-optical images through additional ARINC 818 display inputs.

Figure 3:
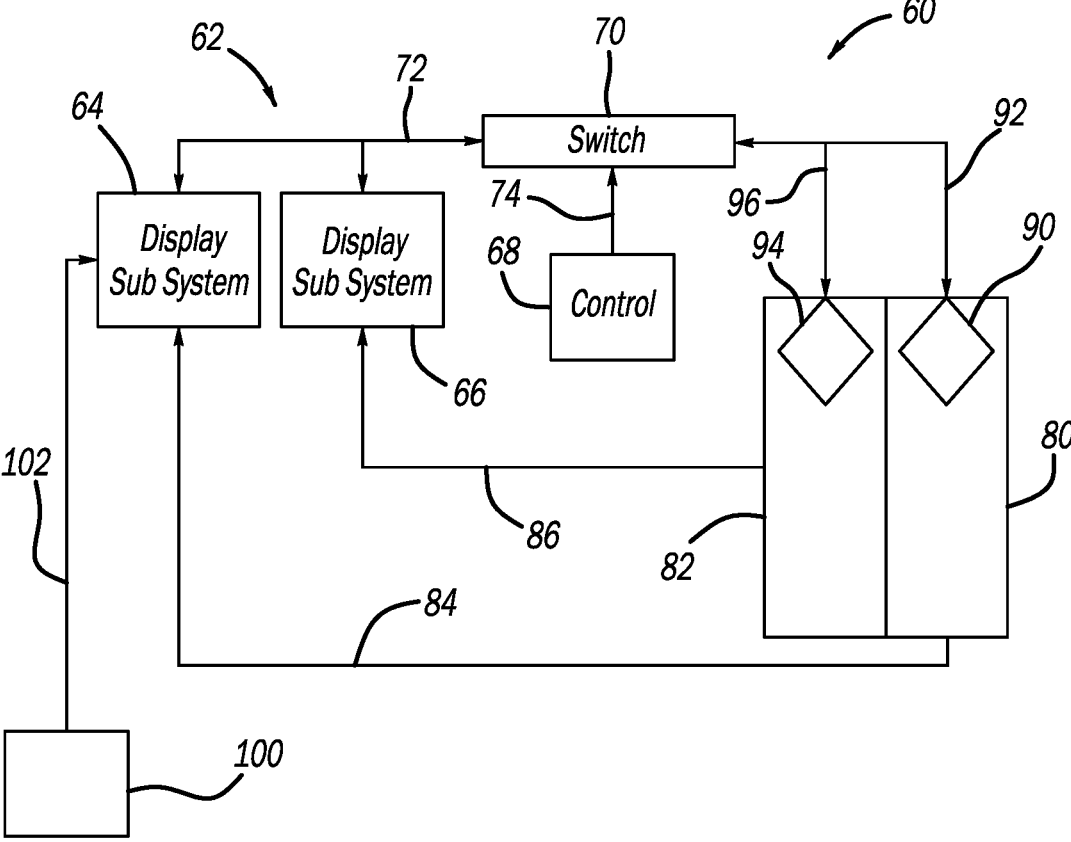
FIG. 3 is a schematic block diagram of an aircraft architecture including a cockpit display system having an off-board graphics rendering gateway system providing additional cockpit display and other functionality.

FIG. 3 is a block diagram of an aircraft architecture 60 that includes a cockpit display system 62 that is commercially available and provided to the aircraft manufacturer by a supplier. The cockpit display system 62 includes dual cockpit display subsystems 64 and 66 that each have a display, such as an LCD, a processor or processors, and integrated modular avionics (IMA) having user applications and CDS software, as discussed above. Cockpit display subsystems of this type will generally include a secondary input that allows various video and other data, such as terrain information, to be received, processed and displayed by the subsystems 64 and 66. Other available cockpit display systems may include more or fewer cockpit display subsystems depending on the aircraft type. The system 62 also includes operator controls 68 that allow an operator or pilot to access and control the system 62, and other aircraft systems, using, for example, a key input device and a cursor control device, through a switch 70 that operates over the AFDX or ARINC 664 protocol, which uses Ethernet cables 72 and 74.

In order to provide the off-board graphics rendering gateway, referred to above, as an add on to the commercially available cockpit display system 62, dual off-board processors 80 and 82 are provided as part of the system 62 that provide custom rendered graphics or video data to the subsystems 64 and 66, respectively. In other words, the off-board processors 80 and 82 process aircraft functionality applications that are not available on the cockpit display subsystems 64 and 66. A video output of the processor 80 is coupled to a secondary input of the subsystem 64 over a fiber optic cable 84 to provide video and graphics data thereto using the ARINC 818 protocol and a video output of the processor 82 is coupled to a secondary input of the subsystem 66 over a fiber optic cable 86 to provide video and graphics data thereto using the ARINC 818 protocol. The processor 80 includes a graphics gateway sub-processor 90 that allows the processor 80 to communicate with the subsystem 64 through the switch 70 over Ethernet cable 92 using the AFDX or ARINC 664 protocol and exchange data and information therebetween, and the processor 82 includes a graphics gateway sub-processor 94 that allows the processor 82 to communicate with the subsystem 66 through the switch 70 over Ethernet cable 96 using the AFDX or ARINC 664 protocol and exchange data and information therebetween, where the sub-processors 90 and 94 store added user applications not found on the subsystems 64 and 66. The processors 80 and 82 provide the custom graphics to the subsystems 64 and 66 on the fiber optic cables 84 and 86, respectively, and the graphics gateway sub-processors 90 and 94 retrieve cockpit display data and information on the cables 92 and 96 from the subsystems 64 and 66, and provide synchronization between the data and information being processed in the processors 80 and 82 and what is being displayed by the subsystems 64 and 66, which provides an integration of new or added cockpit display functions with the COTS cockpit display system 62.

More specifically, the graphics display sub-processors 90 and 94 store customized user applications that are not found on the original cockpit display system 62. Each of these user applications control a display that is simple and contains an "external source" that will be populated by the video and graphics data provided to the subsystems 64 and 66 on the fiber optics cables 84 and 86, respectively. The sub-processors 90 and 94 receive commands to display off-board graphics provided by the added user applications and those commands cause the processors 80 and 82 to send the video data to the subsystems 64 and 66. For example, the pilot may use the operator controls 68 to select a button on the subsystem 66 to display a new function not provided by the original cockpit display system 62. The graphics display sub-processor 94 would then receive a command on the cable 96 to display the graphics and the processor 82 would start streaming video for the graphics on the fiber optics cable 86 to the external source to be displayed by the subsystem 66.

Known cockpit display systems often include other inputs in addition to the secondary input referred to above. Assuming that the cockpit display system 62 is one of those, the architecture 60 may include other aircraft systems 100 that provide video data and information to the subsystem 64 by fiber optic cable 102 using the ARINC 818 protocol to be displayed by the subsystem 64. Examples of video data that could be provided include radar images and electro-optical images.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An aircraft cockpit display system on an aircraft, said system comprising:
   at least one cockpit display subsystem including a display, a subsystem processor and integrated modular avionics (IMA) having user applications and cockpit display software; and
   at least one off-board processor for processing aircraft functionality applications that are not available on the at least one cockpit display subsystem, said at least one off-board processor providing graphical data over fiber optics to the at least one cockpit display subsystem to be displayed by the at least one cockpit display subsystem, said at least one off-board processor including a graphics gateway sub-processor that is in communication with the at least one cockpit display subsystem, said graphics gateway sub-processor exchanging data and information with the at least one cockpit display subsystem to provide synchronization with the graphical data provided by the at least one off-board processor to the at least one cockpit display subsystem, wherein the at least one cockpit display subsystem is responsive to graphical data from one or more other systems on the aircraft.

2. The system according to claim 1 wherein the graphics gateway sub-processor is in communication with the at least one cockpit display subsystem over an Ethernet cable.

3. The system according to claim 1 wherein the at least one off-board processor provides the graphical data on the fiber optics using an ARINC 818 protocol and the graphics gateway sub-processor and the at least one cockpit display subsystem exchange the data and information using an ARINC 664 protocol.

4. The system according to claim 1 further comprising an avionics full-duplex switched Ethernet switch, said graphics gateway sub-processor and the at least one cockpit display subsystem exchanging the data and information through the switch.

5. The system according to claim 1 wherein the other aircraft systems include a radar system.

6. The system according to claim 1 wherein the aircraft is a military aircraft.

7. The system according to claim 1 wherein the at least one cockpit display subsystem is a plurality of cockpit display subsystems and the at least one off-board processor is a plurality of off-board processors, where a separate off-board processor is provided for each cockpit display subsystem.

8. An aircraft cockpit display system on an aircraft, said system comprising:
   a cockpit display subsystem including a display, a subsystem processor and integrated modular avionics (IMA) having user applications and cockpit display software; and
   an off-board processor for processing aircraft functionality that is not available on the cockpit display subsystem, said off-board processor providing graphical data over fiber optics to the cockpit display subsystem to be displayed by the cockpit display subsystem, said off-board processor including a graphics gateway sub-processor that is in communication with the cockpit display subsystem over Ethernet cables, said graphics gateway sub-processor storing user applications that are not found on the cockpit display subsystem and that control displays that contain an external source that is populated by the graphical data provided to the cockpit display subsystem on the fiber optics.

9. The system according to claim 8 further comprising an avionics full-duplex switched Ethernet switch, said graphics gateway sub-processor and the cockpit display subsystem exchanging the data and information through the switch.

10. The system according to claim 8 wherein the cockpit display subsystem is responsive to graphical data from one or more other systems on the aircraft.

11. The system according to claim 10 wherein the other aircraft systems include a radar system.

12. The system according to claim 8 wherein the aircraft is a military aircraft.

13. The system according to claim 8 wherein the at least one off-board processor provides the graphical data on the fiber optics using an ARINC 818 protocol and the graphics gateway sub-processor and the at least one cockpit display subsystem exchange the data and information using an ARINC 664 protocol.

14. An aircraft cockpit display system on an aircraft, said system comprising:
   at least one cockpit display subsystem including a display, a subsystem processor and integrated modular avionics (IMA) having user applications and cockpit display software;
   at least one off-board processor for processing aircraft functionality applications that are not available on the at least one cockpit display subsystem, said at least one off-board processor providing graphical data over fiber optics to the at least one cockpit display subsystem to be displayed by the at least one cockpit display subsystem, said at least one off-board processor including a graphics gateway sub-processor that is in communication with the at least one cockpit display subsystem, said graphics gateway sub-processor exchanging data and information with the at least one cockpit display subsystem to provide synchronization with the graphical data provided by the at least one off-board processor to the at least one cockpit display subsystem; and an avionics full-duplex switched Ethernet switch, said graphics gateway sub-processor and the at least one cockpit display subsystem exchanging the data and information through the switch.

15. An aircraft cockpit display system on an aircraft, said system comprising:

at least one cockpit display subsystem including a display, a subsystem processor and integrated modular avionics (IMA) having user applications and cockpit display software; and at least one off-board processor for processing aircraft functionality applications that are not available on the at least one cockpit display subsystem, said at least one off-board processor providing graphical data over fiber optics to the at least one cockpit display subsystem to be displayed by the at least one cockpit display subsystem, said at least one off-board processor including a graphics gateway sub-processor that is in communication with the at least one cockpit display subsystem, said graphics gateway sub-processor exchanging data and information with the at least one cockpit display subsystem to provide synchronization with the graphical data provided by the at least one off-board processor to the at least one cockpit display subsystem, wherein the aircraft is a military aircraft.

* * * * *

8